United States Patent
Richardet, Jr.

(10) Patent No.: US 8,172,603 B1
(45) Date of Patent: May 8, 2012

(54) QUICK-RELEASE BATTERY CABLE SYSTEM

(76) Inventor: David Richardet, Jr., Chester, IL (US)

( * ) Notice: Subject to any disclaimer, the term of this patent is extended or adjusted under 35 U.S.C. 154(b) by 0 days.

(21) Appl. No.: 12/724,907

(22) Filed: Mar. 16, 2010

Related U.S. Application Data (60) Provisional application No. 61/210,143, filed on Mar. 16, 2009.

(51) Int. Cl.
*H01R 11/00* (2006.01)
(52) U.S. Cl. .......................... 439/504; 439/759
(58) Field of Classification Search .......... 439/759–762, 439/502–504
See application file for complete search history.

(56) References Cited

U.S. PATENT DOCUMENTS

| | | | |
|---|---|---|---|
| 2,294,085 A | 8/1942 | Hanson | |
| 3,345,601 A | 10/1967 | Horsch et al. | |
| 3,519,977 A | 7/1970 | Swearingen | |
| 3,535,899 A | 10/1970 | Gardner et al. | |
| 3,989,544 A | 11/1976 | Santo | |
| 4,272,142 A * | 6/1981 | Zapf | 439/504 |
| 4,531,798 A | 7/1985 | Baur et al. | |
| 5,011,437 A * | 4/1991 | Gibbons | 439/759 |
| 5,246,379 A | 9/1993 | Wright | |
| 5,599,210 A | 2/1997 | Green | |
| 5,707,250 A * | 1/1998 | Smithson | 439/504 |
| 6,166,454 A | 12/2000 | Schaller et al. | |
| 6,343,949 B1 * | 2/2002 | Floyd | 439/504 |
| 7,008,259 B2 * | 3/2006 | Agnew | 439/504 |
| 7,775,365 B1 * | 8/2010 | More | 206/572 |
| 2005/0070155 A1 * | 3/2005 | Horenstein | 439/522 |

* cited by examiner

*Primary Examiner* — Truc Nguyen
(74) *Attorney, Agent, or Firm* — Montgomery Patent & Design, LLC; Robert C. Montgomery; Joseph T. Yaksich (57) ABSTRACT

A polarized quick disconnect battery cable system is herein disclosed, comprising a mating pair of polarized and keyed electrical connectors capable of carrying large currents from a vehicle's primary battery to the vehicle's starter. The system also provides an alligator clamping accessory allowing quick connection of the primary battery thereto a charging battery for charging purposes. The system is intended for use with large batteries typically found on motor vehicles, golf carts, boats, recreational vehicles, motorcycles, and the like. The system comprises heavy cables of the same gauge as is commonly used with such batteries. The quick disconnect feature allows for the easy connection and disconnection of battery wiring without using tools such as wrenches, pliers, screwdrivers, or the like, thereby reducing the likelihood of accidentally shorting the battery and producing large sparks or even explosions. The system is packaged within a convenient carrying case.

10 Claims, 5 Drawing Sheets

QUICK-RELEASE BATTERY CABLE SYSTEM

RELATED APPLICATIONS

The present invention was first described in and claims the benefit of U.S. Provisional Application No. 61/210,143 filed Mar. 16, 2009, the entire disclosures of which are incorporated herein by reference.

FIELD OF THE INVENTION

The present invention relates generally to electrical connectors, and in particular, to a quick-release battery terminal connection particularly adapted for the quick and safe connection of large batteries such as car batteries.

BACKGROUND OF THE INVENTION

Large storage batteries are utilized in a variety of applications, particularly in motor vehicles such as automobiles, motorcycles, boats, and the like. The removal, recharging, conditioning, or use of such batteries is commonly encountered during routine maintenance motor vehicles and common problems encountered with these vehicles.

The operation of such batteries can be both difficult and dangerous. The large terminals and high voltages result in the use of specific hardware for such batteries. The removal or reconnection of the battery terminals often requires tools to accomplish. The use of conventional tools for such a job is often dangerous, as metal portions can cause sparks, minor explosions, or shorting of the battery.

Various attempts have been made to provide electrical connections adapted for motor batteries. Examples of these attempts can be seen by reference to several U.S. patents. U.S. Pat. No. 4,488,147, issued in the name of Signorile, describes a battery jumper cable system which provides removable electrical connectors to a conventional car battery.

U.S. Pat. No. 5,733,152, issued in the name of Freitag, describes a battery terminal adaptor and connector. The Freitag device provides an alternate means of connection to the terminals of such a battery.

While these devices fulfill their respective, particular objectives, each of these references suffer from one (1) or more of the aforementioned disadvantages. Many such devices do not provide a secure, stable connection. Also, many such devices require the use of additional tools. Furthermore, many such devices do not provide features to assist a user who is not accustomed to working with such parts. In addition, many such devices are not particularly adaptable to various common scenarios. Accordingly, there exists a need for battery terminal connection without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide a battery terminal connection which provides secure and stable connection to a motor vehicle battery or the like adaptable to a variety of common scenarios and which is simple and quick for an average user. Thus, the object of the present invention is to solve the aforementioned disadvantages and provide for this need.

To achieve the above objectives, it is an object of the present invention to provide a means for the quick connection and disconnection of a common vehicle battery to a vehicle starter, charging battery, or the like without the use of hand tools. The system comprises a protective carrying case which contains a battery connector assembly, a starter connector assembly, and an alligator connector assembly.

Another object of the present invention is to provide protective safekeeping of the system during periods of non-use by constructing the carrying case of a rugged material and including common features such as a handle, a flexible hinge, and a latching mechanism.

Yet still another object of the present invention is to provide an attachment means to a battery via the battery connector assembly, which comprises a pair of battery ring terminals. The battery connector further comprises an accessory connector for providing power to various accessories such as running lights, fog lights, and the like. An end portion of the battery connector comprises a first fastener which provides a male heavy duty electrical connector which corresponds to the start connector and alligator connector assemblies.

Yet still another object of the present invention is to provide semi-permanent attachment of the system to an existing vehicle starter via the starter connector assembly. The starter connector assembly comprises a pair of starter ring terminals for connection to positive and negative terminals on respective solenoid and ground portions of the starter. The starter connector assembly further comprises a second fastener equipped with female plug features which slidingly mate with the first fastener.

Yet still another object of the present invention is to provide temporary clamping attachment of the system to a charging battery via the alligator connector assembly in order to start a vehicle's engine, recharge the primary battery, jump-start a car, or the like. The alligator connector assembly comprises a pair of conventional alligator clips with polarity markings for connection to the proper terminals. The alligator connector assembly further comprises a second fastener equipped with female plug features which slidingly mate with the first fastener.

Yet still another object of the present invention is to prevent accidental shorting of the battery by comprising the first and second fasteners of corresponding keyed electrical connectors, thereby precluding the improper joining of negative and positive terminals.

Yet still another object of the present invention is to provide a method of utilizing the device that provides a unique means of quick connecting the battery connector assembly to a primary battery, selectively choosing the starter or alligator connector assembly based on a user's needs, quickly connecting the starter or alligator assembly to a desired secondary source, mating the assemblies in a correct manner via the first and second fasteners, and easily and safely storing the system during periods of non-use.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | DESCRIPTIVE KEY |
|---|---|
| 10 | quick-release battery cable system |
| 20 | battery connector assembly |
| 21 | first fastener |
| 22 | male plug feature |
| 23 | battery ring terminal |
| 24 | negative battery cable |
| 25 | positive battery cable |
| 28 | accessory connector |
| 29 | accessory wire |
| 30 | starter connector assembly |
| 31 | second fastener |
| 32 | female plug feature |
| 33 | starter ring terminal |
| 34 | negative starter cable |
| 35 | positive starter cable |
| 37 | starter |
| 40 | alligator connector assembly |
| 43 | alligator clip |
| 44 | negative alligator cable |
| 45 | positive alligator cable |
| 48 | black handle cover |
| 49 | red handle cover |
| 50 | carrying case |
| 51 | latching mechanism |
| 52 | handle |
| 53 | lid |
| 54 | padding |
| 60 | crimped and soldered connection |
| 100 | primary battery |
| 110 | charging battery |
| 120 | positive battery terminal |
| 130 | negative battery terminal |

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a quick-release battery cable system (herein described as the "system") 10, which provides a means for a common vehicular battery 100 to be quickly connected and disconnected from a vehicle starter 37 and also to a charging battery 110 without using hand tools. The system 10 comprises a battery connector assembly 20, a starter connector assembly 30, and an alligator connector assembly 40; all of which are provided in a carrying case 50 envisioned being stored within a vehicle until needed. The system 10 offers an efficient electrical connection with reduced voltage losses for automobile vehicles, marine vehicles, motorcycles, lawn tractors, and the like.

Figure 1:
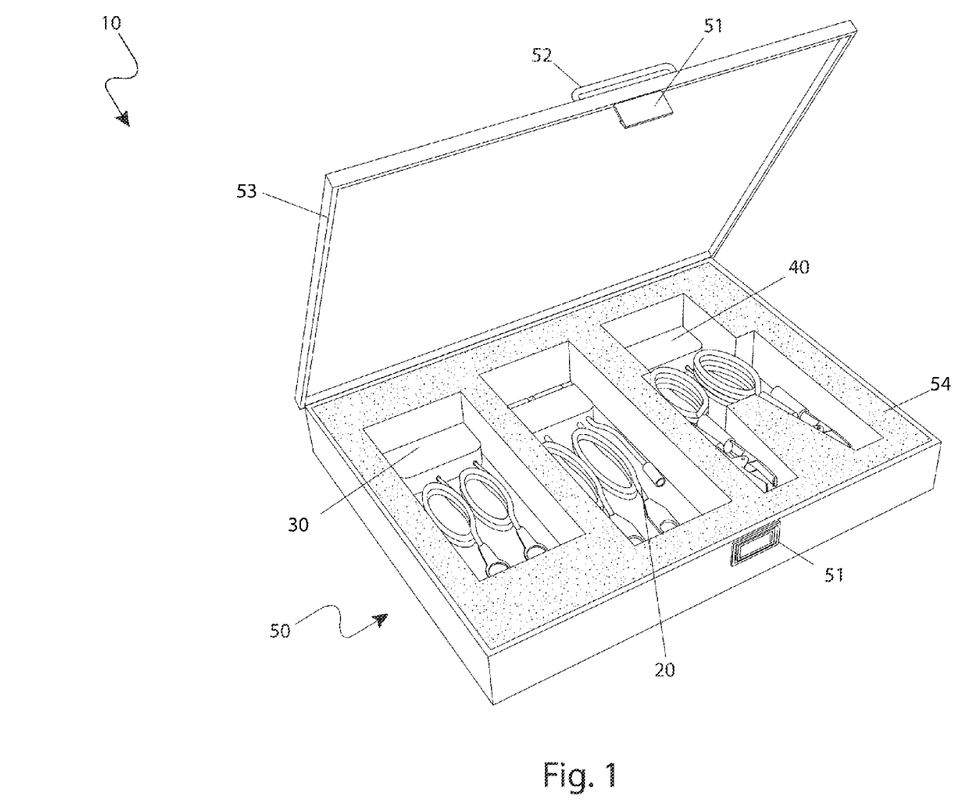
FIG. 1 is a perspective view of the quick-release battery cable system 10 depicting storage therewithin a carrying case 50, according to a preferred embodiment of the present invention.

Referring now to FIG. 1, a perspective view of the system 10 depicting storage therewithin a carrying case 50, according to the preferred embodiment of the present invention, is disclosed. The system 10 comprises a carrying case 50 which provides a carrying and protection means to the battery connector assembly 20, the starter connector assembly 30, and the alligator connector assembly 40. The carrying case 50 comprises a rugged rectangular container having a shallow lid portion 53 which pivots about an integrally-molded flexible hinge along a rear distal edge. The lid 53 may be secured in a closed state via a latching mechanism 51 located along a proximal front edge. The carrying case 50 provides protective safekeeping of the system 10 while not in use. The latching mechanism 51 is envisioned to be a springing or pivoting mechanical latch; however, other closing and securing means may be provided such as, but not limited to: a padlock attachment, a disk tumbler-type lock, and various latching hasps, without deviating from the concept and as such should not be interpreted as a limiting factor of the apparatus 10. The carrying case 50 also comprises a common pivoting "U"-shaped carrying handle 52 for normal transportation thereof. The carrying case 50 is envisioned to be fabricated from a rigid plastic such as polypropylene, acrylonitrile butadiene styrene (ABS), or the like and is filled with a padding 54 material such as polyurethane foam which further comprises recessed cut-out areas being shaped so as to snuggly receive the connector assemblies 20, 30, 40 thereinto for maximum protection.

Figure 2A:
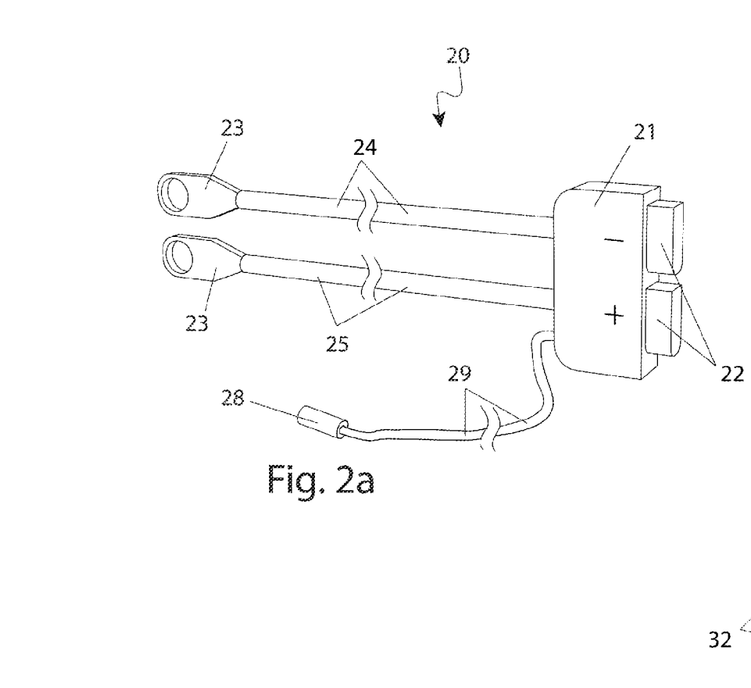
FIG. 2a is a perspective view of a battery connector assembly portion 20 of a quick-release battery cable system 10, according to a preferred embodiment of the present invention.

Referring now to FIG. 2a, a perspective view of a battery connector assembly portion 20 of the system 10, according to the preferred embodiment of the present invention, is disclosed. The battery connector assembly 20 comprises a first fastener 21, a pair of battery ring terminals 23, a negative battery cable 24, a positive battery cable 25, and an accessory connector 28. The battery ring terminals 23 provide an attachment means thereto a positive battery terminal 120 and a negative battery terminal 130 thereon a primary battery 100 (see FIG. 3). The battery ring terminals 23 are attached to appropriately gauged battery cables 24, 25 comprising heavy gauged conductors being approximately five (5) feet long. The first fastener 21 comprises a heavy duty electrical connector equipped with a pair of male plug features 22 each comprising engaging keyed features to guarantee properly matched polarities, thereby preventing possible electrical shorting. The first fastener 21 also comprises an integral accessory connector 28 and an accessory wire 29, thereby providing power thereto accessories such as, but not limited to: running lights, fog lights, and the like. The accessory connector 28 is connected to the positive side of the first fastener 21 via the accessory wire 29. The accessory connector 28 comprises a common female wire terminal connector and the accessory wire 29 comprises an appropriately gauged red electrical wire. The attachment means between said first fastener 21, the battery ring terminals 23, and respective negative 24 and positive 25 battery cables are preferably made utilizing a conventional crimped and soldered connection 60 or equivalent wire joining methods.

The system 10 is illustrated here being configured with battery ring terminals 23, ideal for bolt-on-type battery terminals; however, it is understood that the battery connector assembly 20 may utilize other terminal fastening hardware for use with primary batteries 100 having other terminal types such as, but not limited to: top post, side post, or the like, and as such should not be interpreted as a limiting factor of the apparatus 10.

Figure 2B:
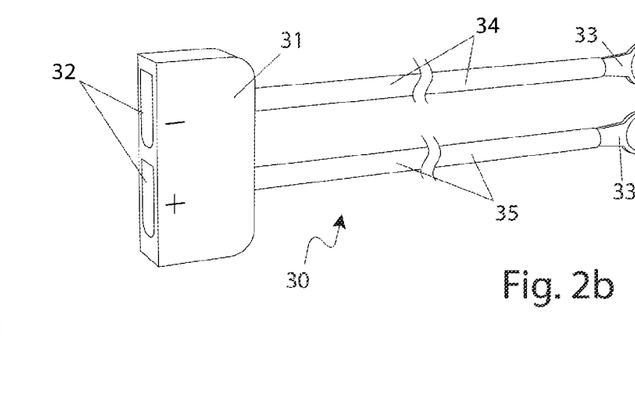
FIG. 2b is a perspective view of a starter connector assembly portion 30 of the quick-release battery cable system 10, according to a preferred embodiment of the present invention.

Referring now to FIG. 2b, a perspective view of a starter connector assembly portion 30 of the system 10, according to the preferred embodiment of the present invention, is disclosed. The starter connector assembly 30 provides a semi-permanent attachment of the system 10 thereto an existing vehicle starter 37 and comprises a second fastener 31, a negative starter cable 34, a positive starter cable 35, and a pair of starter ring terminals 33. Each starter ring terminal 33 is to be connected to respective positive and negative terminals on respective solenoid and ground portions of the starter 37 (see FIG. 3). The starter ring terminals 33 are attached to appropriately gauged standard copper starter cables 34, 35 being approximately five (5) feet long and capable of delivering a high current to the starter 37. The second fastener 31 is to be equipped with female plug features 32 being sized and shaped to slidingly mate with the aforementioned first fastener 21 (see FIG. 2a). Said female plug features 32 also comprise a keyed shape so as to guarantee properly matched electrical polarities.

Figure 2C:
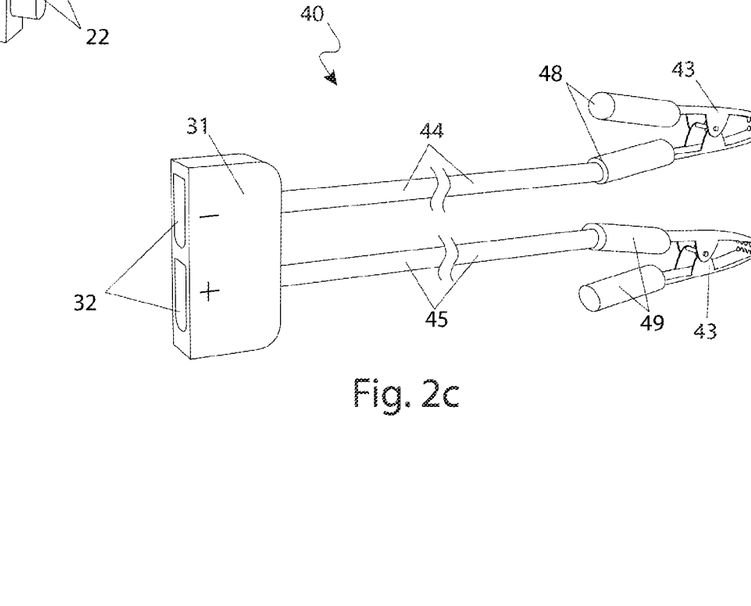
FIG. 2c is a perspective view of an alligator connector assembly portion 40 of the quick-release battery cable system 10, according to a preferred embodiment of the present invention.

Referring now to FIG. 2c a perspective view of an alligator connector assembly portion 40 of the system 10, according to the preferred embodiment of the present invention, is disclosed. The alligator connector assembly 40 provides a temporary clamping attachment of the system 10 thereto a charging battery 110 and comprises a second fastener 31, a pair of alligator clips 43, a negative alligator cable 44, and a positive alligator cable 45. The alligator connector assembly 40 enables connection of a dead or discharged primary battery 100 to a charging battery 110; thereby providing an initial charge needed to start a vehicle's engine and/or to recharge the primary battery 100 (see FIG. 4). The alligator clips 43 comprise spring-loaded clamping units being similar to like devices used commonly on conventional jumper cables and being fabricated using highly conductive metals such as, but not limited to: bare copper, zinc-plated copper, copper-plated iron/steel, or the like. The alligator clips 43 also provide polarity identification via respective negative "−" black handle covers 48 and positive "+" red handle covers 49 being made of plastic and visually representing the two (2) polarities of the vehicles direct current (DC) system. The attached alligator clips 43 are to clamp thereto battery terminal portions 120, 130 of the charging battery 110 to deliver a charge in an expected manner. The alligator cables 44, 45 comprise heavy gauged conductors being approximately five (5) feet long and extending between said alligator clips 43 and the second fastener 31 being durably attached, as previously described, using crimped and soldered connections 60.

Figure 3:
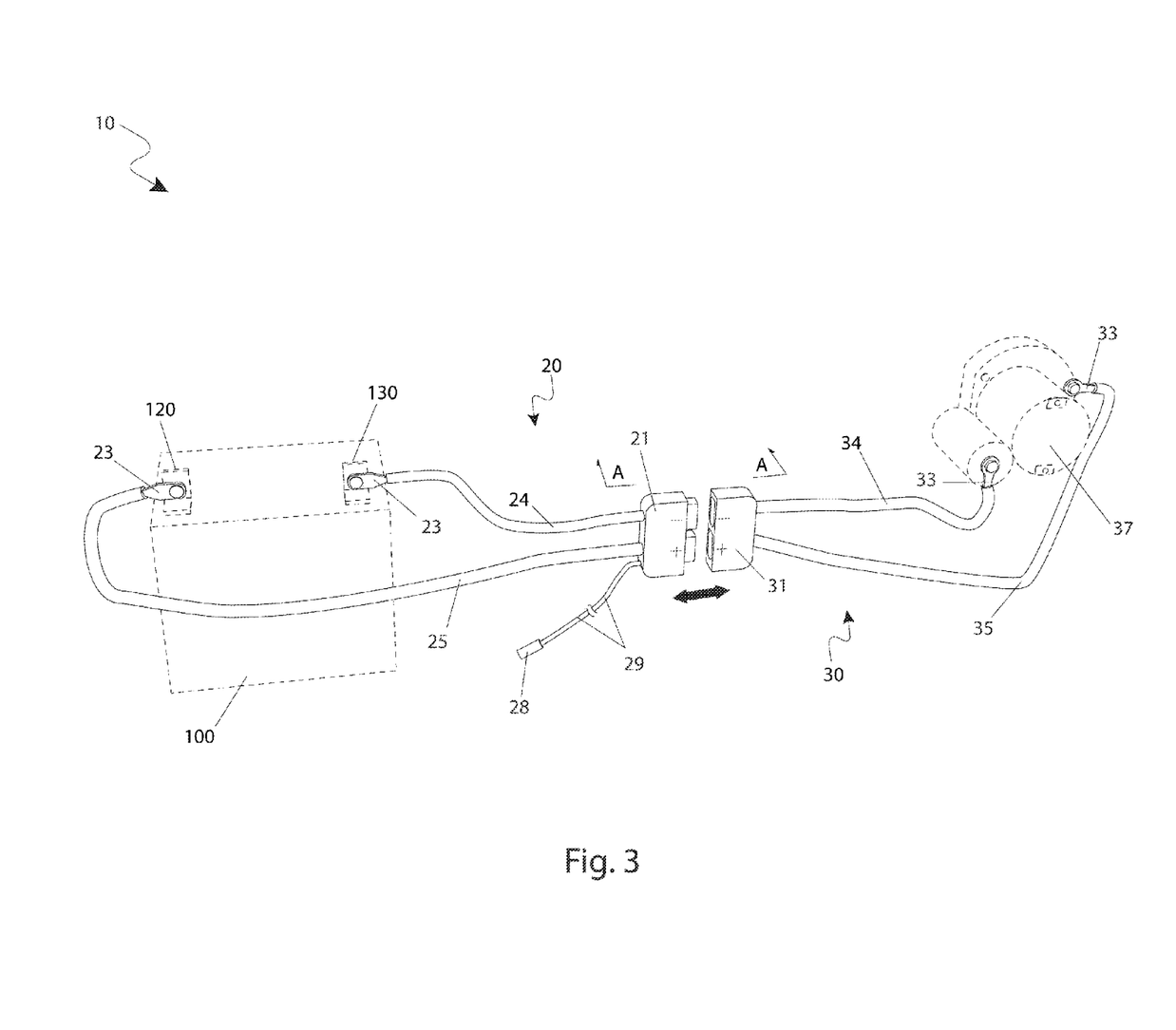
FIG. 3 is an in-use view of the quick-release battery cable system 10 depicting utilization therebetween a primary battery 100 and a starter 37, according to a preferred embodiment of the present invention.

Referring now to FIG. 3, an in-use view of the system 10 depicting utilization of the apparatus 10 between a primary battery 100 and a starter 37, according to the preferred embodiment of the present invention, is disclosed. As shown here, the primary battery 100 may establish electrical communication therewith the starter 37 upon engagement of the first fastener portion 21 of the battery connector assembly 20 and the second fastener portion 31 of the starter connector assembly 30. The primary battery 100 and the starter 37 may operate in a conventional manner in conjunction with a vehicle's ignition system once the first fastener 21 is engaged therewith the second fastener 31.

The system 10 is illustrated here being applied thereto a primary battery 100 having a positive battery terminal 120 and a negative battery terminal 130 being bolt-on-type terminals having an "L"-shaped post; however, the teachings of the system 10 may be applied equally thereto other terminal types such as, but not limited to: Society of Automotive Engineers (SAE) top post, side post, or the like, being easily installed using different models of the battery connector assembly 20 being configured with correctly corresponding terminal fastening hardware.

Figure 4:
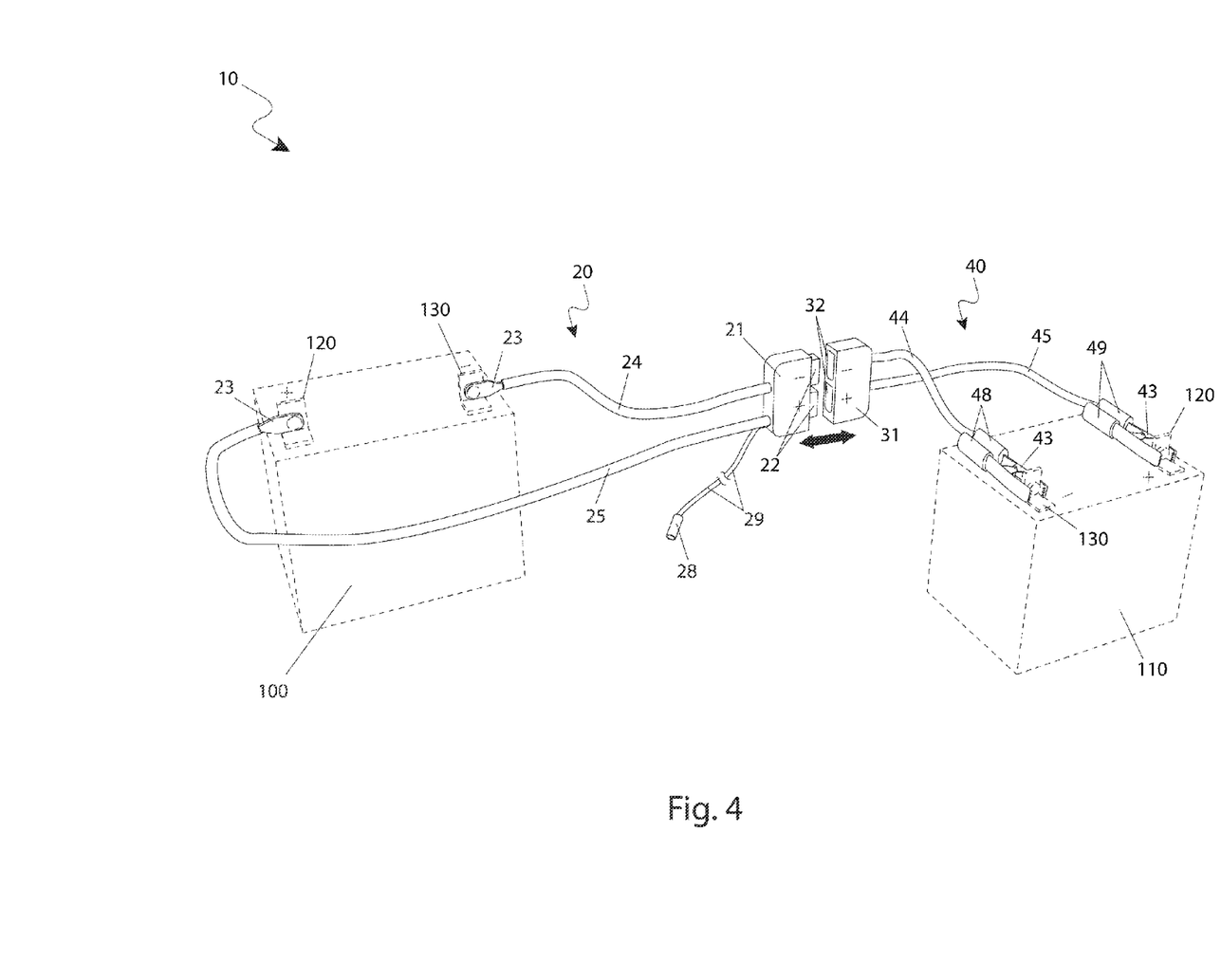
FIG. 4 is an in-use view of the quick-release battery cable system 10 depicting utilization therebetween a primary battery 100 and a charging battery 110, according to a preferred embodiment of the present invention; AND, FIG. 5 is a section view of first 21 and second 31 fastener portions of the quick-release battery cable system 10 taken along section line A-A (see FIG. 3), according to a preferred embodiment of the present invention.

Referring now to FIG. 4, an in-use view of the system 10 depicting utilization of the apparatus 10 therebetween a primary battery 100 and a charging battery 110, according to the preferred embodiment of the present invention, is disclosed. When the primary battery 100 is discharged, the system 10 can be utilized to connect the discharged primary battery 100 thereto the charging battery 110 by means of the alligator connector assembly 40. The alligator clips 43 are attached thereto positive 120 and negative 130 battery terminal portions of the charging battery 110. The first fastener 21 is then engaged therewith the second fastener 31 to transfer electrical power to the primary battery 100.

Figure 5:
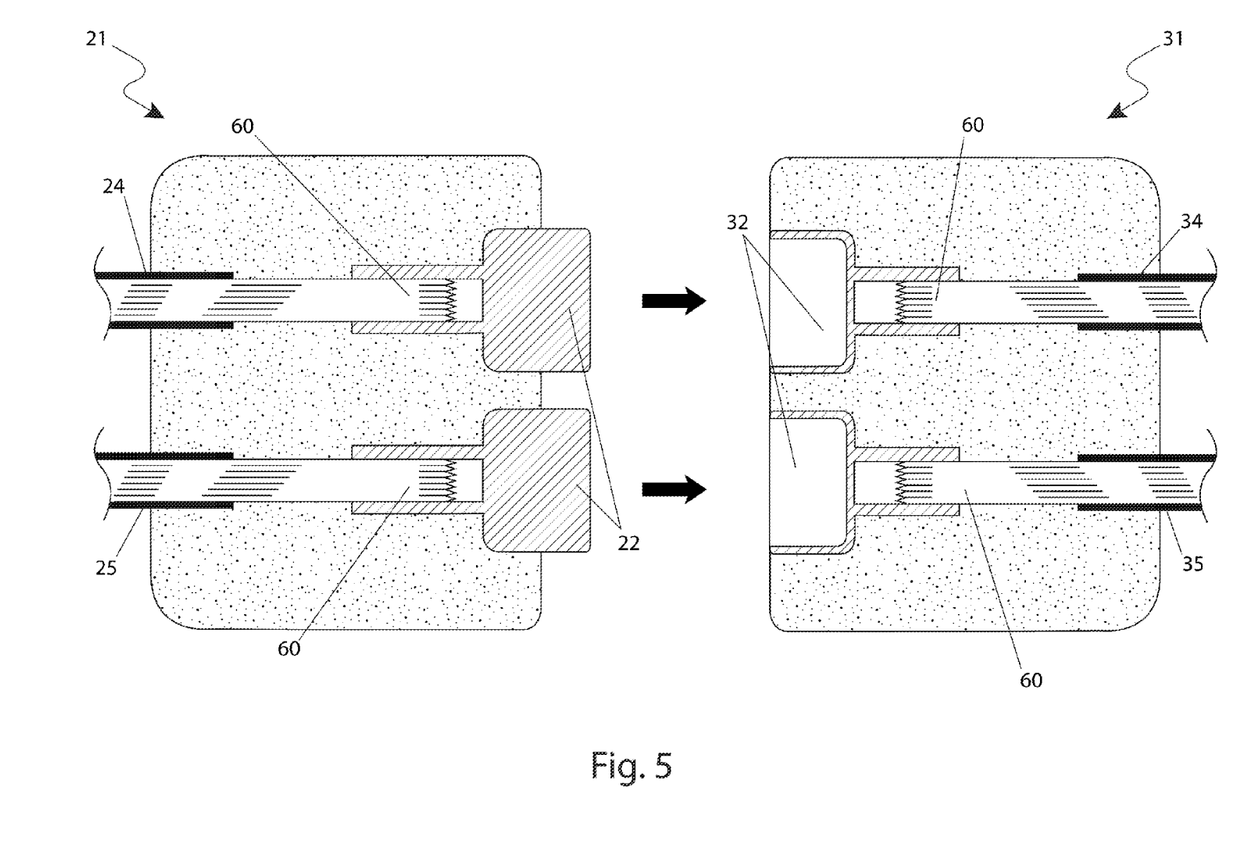

Referring now to FIG. 5, a section view of first 21 and second 31 fastener portions of the system 10 as taken along section line A-A (see FIG. 3), according to a preferred embodiment of the present invention, is disclosed. The first fastener 21 and second fastener 31 are illustrated here showing the sliding engagement between, to enable a flow of current through via the male 22 and female 32 plug features which comprise matching keyed features to guarantee properly matched electrical polarities, thereby preventing accidental shorting between incompatible fasteners. Furthermore, said first 21 and second 31 fasteners are envisioned to be made of durable and highly electrically resistant materials such AS Bakelite or other thermosetting polymers, thereby allowing secure molding around the previously described crimped and soldered connections 60 thereto the cables 24, 25, 34, 35.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIGS. 1, 3, and 4.

The method of installing and utilizing the system 10 may be achieved by performing the following steps: opening the latching mechanism 51 on the carrying case 50; removing the battery connector assembly 20 and starter connector assembly 30 therefrom the corresponding cut-outs in the padding 54 within the carrying case 50; bolting the battery ring terminal portions 23 of said battery connector assembly 20 thereto the positive 120 and negative 130 battery terminals on the primary battery 100 using existing bolts; giving care to properly match the polarity of the first fastener 21 and the primary battery 100; connecting said starter ring terminals 33 to the proper polarity electrical contacts thereupon the starter 37 using original starter hardware; fully engaging the male plug features 22 of the first fastener 21 into the female plug features 32 of the second fastener 31; and, allowing the primary battery 100 to deliver current thereto the starter 37 upon actuation by a vehicle ignition system while using the system 10.

In an event that the primary battery 100 lacks a sufficient charge to start the vehicle, connection of the primary battery 100 thereto a charging battery 110 for recharging purposes may be achieved by performing the following steps: disengaging the first fastener portion 21 of the battery connector assembly 20 therefrom the second fastener portion 31 of the starter connector assembly 30; removing the alligator connector assembly 40 therefrom the carrying case 50; clamping the alligator clip portion 43 having black handle covers 48, thereto the negative battery terminal 130 of the charging battery 110; clamping the alligator clip portion 43 having red handle covers 49, thereto the positive battery terminal 120 of the charging battery 110; engaging the first fastener 21 thereinto the second fastener 31 portion of the alligator connector assembly 40; initiating a starting process or; allowing sufficient time to allow the charging battery 110 to recharge the primary battery 100; unfastening the first fastener portion 21 of the battery connector assembly 20 therefrom the second fastener portion 31 of the alligator connector assembly 40; unclipping said alligator clips 43 therefrom the charging battery 110; placing said alligator connector assembly 40 thereinto the carrying case 50; restoring said first fastener portion 21 of the battery connector assembly 20 thereto the second fastener portion 31 of the starter connector assembly 30; energizing the starter 37 as needed in a normal fashion using the recharged primary battery 100; and, storing the apparatus 10 using the carrying case 50 until needed again.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A quick-release vehicular battery cable system for connecting and disconnecting a primary vehicular battery to at least one of a vehicular starter and a charging vehicular battery without using hand tools, said quick-release vehicular battery cable system comprising:
    a battery connector assembly adapted to be removably connected to the primary vehicular battery;
    a starter connector assembly adapted to be removably connected to the vehicular starter; and,
    an alligator connector assembly adapted to be removably connected to the charging vehicular battery;
    wherein said battery connector assembly is independently and separately connected to one of said starter connector and alligator connector assemblies as well as the primary vehicular battery for transferring power to the primary vehicular battery;
    wherein said alligator connector assembly is spaced from said starter connector assembly when said battery connector assembly is connected to said starter connector assembly;
    wherein said starter connector assembly is spaced from said alligator connector assembly when said battery connector assembly is connected to said alligator connector assembly;
    wherein said battery connector assembly comprises:
        a first fastener having a plurality of male plug features for providing proper matched polarities and thereby preventing electrical shorting when connected to said at least one starter and alligator connector assemblies;
        a plurality of battery ring terminals adapted to be attached to positive and negative battery terminals of the primary vehicular battery respectively;
        a negative battery cable;
        a positive battery cable; and,
        an accessory connector having an accessory wire connected to said first fastener;
    wherein said battery ring terminals are attached to said negative and positive battery cables respectively;
    wherein said accessory connector is adapted to provide power to electrical accessories;
    wherein said alligator connector assembly comprises:
        a second fastener;
        a plurality of alligator clips having polarity identification covers respectively;
        a negative alligator cable; and,
        a positive alligator cable;
    wherein said alligator connector assembly is adapted to provide an initial charge to recharge the primary vehicular battery;
    wherein said alligator clips are adapted to be clamped to battery terminal portions of the charging vehicular battery as well as said positive and negative alligator cables respectively;
    wherein said alligator clips are adapted to be attached to positive and negative battery terminal portions of the charging vehicular battery;
    wherein said first fastener of said battery connector assembly is engaged with said second fastener of said alligator connector assembly to transfer electrical power to the primary vehicular battery;
    wherein said first fastener is slidably engaged to said second fastener and thereby enables current flow through said male and female plug features respectively; and,
    wherein each of said first and second fasteners have matching keyed features to properly matched electrical polarities between said first and second fasteners.

2. The quick-release vehicular battery cable system of claim 1 wherein said starter connector assembly comprises:
    a second fastener having a plurality of female plug features slidably mated with said male plug features of said first fastener;
    a negative starter cable;
    a positive starter cable; and,
    a plurality of starter ring terminals adapted to be connected to positive and negative terminals on solenoid and ground portions of the vehicular starter respectively;

wherein said starter ring terminals are attached to positive and negative starter cables for delivering a high current to the vehicle starter;

wherein said female plug features have a key shape to provide proper matched electrical polarities with said male plug features respectively.

3. The quick-release vehicular battery cable system of claim 1, further comprising: a carrying case for carrying and protecting said battery connector assembly, said starter connector assembly, and said alligator connector assembly, wherein said carrying case includes:

a pivotal lid portion;

a latching mechanism located along a proximal front edge of said lid portion;

a U-shaped carrying handle attached to said lid portion; and, a padding having recessed cut-out areas shaped to receive said battery, starter and alligator connector assemblies.

4. The quick-release vehicular battery cable system of claim 2, wherein the primary vehicular battery is adapted to establish electrical communication with the starter upon engagement of said first fastener portion of said battery connector assembly and said second fastener portion of said starter connector assembly respectively.

5. A quick-release vehicular battery cable system for connecting and disconnecting a primary vehicular battery to at least one of a vehicular starter and a charging vehicular battery without using hand tools, said quick-release vehicular battery cable system comprising:

a portable battery connector assembly adapted to be removably connected to the primary vehicular battery;

a portable starter connector assembly adapted to be removably connected to the vehicular starter; and, a portable alligator connector assembly adapted to be removably connected to the charging vehicular battery;

wherein said battery connector assembly is independently and separately connected to one of said starter connector and alligator connector assemblies as well as the primary vehicular battery for transferring power to the primary vehicular battery;

wherein said alligator connector assembly is spaced from said starter connector assembly when said battery connector assembly is connected to said starter connector assembly; and, wherein said starter connector assembly is spaced from said alligator connector assembly when said battery connector assembly is connected to said alligator connector assembly;

wherein said starter connector assembly comprises:

a second fastener having a plurality of female plug features slidably mated with
said male plug features of said first fastener;

a negative starter cable;

a positive starter cable; and, a plurality of starter ring terminals adapted to be connected to positive and negative terminals on solenoid and ground portions of the vehicular starter respectively;

wherein said starter ring terminals are attached to positive and negative starter cables for delivering a high current to the vehicle starter;

wherein said female plug features have a key shape to provide proper matched electrical polarities with said male plug features respectively; and, wherein the primary vehicular battery is adapted to establish electrical communication with the starter upon engagement of said first fastener portion of said battery connector assembly and said second fastener portion of said starter connector assembly respectively.

6. The quick-release vehicular battery cable system of claim 5, wherein said battery connector assembly comprises:

a first fastener having a plurality of male plug features for providing proper matched polarities and thereby preventing electrical shorting when connected to said at least one starter and alligator connector assemblies;

a plurality of battery ring terminals adapted to be attached to positive and negative battery terminals of the primary vehicular battery respectively;

a negative battery cable;

a positive battery cable; and, an accessory connector having an accessory wire connected to said first fastener;

wherein said battery ring terminals are attached to said negative and positive battery cables respectively; and, wherein said accessory connector is adapted to provide power to electrical accessories.

7. The quick-release vehicular battery cable system of claim 6, wherein said alligator connector assembly comprises:

a second fastener;

a plurality of alligator clips having polarity identification covers respectively;

a negative alligator cable; and, a positive alligator cable;

wherein said alligator connector assembly is adapted to provide an initial charge to recharge the primary vehicular battery; and, wherein said alligator clips are adapted to be clamped to battery terminal portions of the charging vehicular battery as well as said positive and negative alligator cables respectively.

8. The quick-release vehicular battery cable system of claim 5, further comprising: a carrying case for carrying and protecting said battery connector assembly, said starter connector assembly, and said alligator connector assembly, wherein said carrying case includes:

a pivotal lid portion;

a latching mechanism located along a proximal front edge of said lid portion;

a U-shaped carrying handle attached to said lid portion; and, a padding having recessed cut-out areas shaped to receive said battery, starter and alligator connector assemblies.

9. The quick-release vehicular battery cable system of claim 7, wherein said alligator clips are adapted to be attached to positive and negative battery terminal portions of the charging vehicular battery;

wherein said first fastener of said battery connector assembly is engaged with said second fastener of said alligator connector assembly to transfer electrical power to the primary vehicular battery.

10. The quick-release vehicular battery cable system of claim 7, wherein said first fastener is slidably engaged to said second fastener and thereby enables current flow through said male and female plug features respectively;

wherein each of said first and second fasteners have matching keyed features to properly matched electrical polarities between said first and second fasteners.

\* \* \* \* \*